United States Patent [19]

Marcotullio et al.

[11] Patent Number: 5,934,303
[45] Date of Patent: Aug. 10, 1999

[54] PROCESS FOR MOVING HEAVY CRUDE OILS WITH WATER HAVING A HIGH CONTENT OF SALTS

[75] Inventors: Armando Marcotullio, S. Donato Milanese; Enrico Borgarello, Merlino; Alberto Di Lullo, Sirmione; Annibale Manclossi, Offanengo, all of Italy

[73] Assignee: AGIP S.p.A., Milano, Italy

[21] Appl. No.: 09/002,918

[22] Filed: Jan. 5, 1998

[30] Foreign Application Priority Data

Jan. 23, 1997 [IT] Italy .................................. MI97A0122

[51] Int. Cl.⁶ ........................................................ F17D 1/17
[52] U.S. Cl. .................................................................. 137/13
[58] Field of Search ................................................. 137/13

[56] References Cited

U.S. PATENT DOCUMENTS 4,134,415  1/1979  Flournoy et al. .
5,535,769  7/1996  Marcotullio et al. .
5,571,452  11/1996  Marcotullio et al. .

FOREIGN PATENT DOCUMENTS 1113529    12/1981  Canada .
0 671 458   9/1995  European Pat. Off. .
WO 94/01684  1/1994  WIPO .

*Primary Examiner*—Gerald A. Michalsky
*Attorney, Agent, or Firm*—Oblon, Spivak, McClelland, Maier & Neustadt, P.C.

[57] ABSTRACT

Process for recovering and moving highly viscous petroleum derivatives by the formation of aqueous dispersions in the presence of water with a salinity of more than 0.6% by weight, particularly from 1 to 15% by weight, with the use of hydrosoluble sulfonated dispersants, said process being characterized in that the above sulfonated dispersants have a content of the high molecular weight fraction, determined by SEC analysis (Size Exclusion Chromatography), of more than 4%.

16 Claims, No Drawings

PROCESS FOR MOVING HEAVY CRUDE OILS WITH WATER HAVING A HIGH CONTENT OF SALTS

The present invention relates to a process for recovering and moving heavy crude oils by means of aqueous solutions of sulfonated dispersants.

More specifically, the present invention relates to a process for recovering and moving heavy crude oils by means of aqueous solutions of dispersants using water with a high degree of salinity.

The difficulty of recovering heavy crude oils, particularly those with an API grade of less than 15, is well known to experts, owing to their high viscosity which prevents or considerably slows down their flow towards drill-pipes.

One method for improving the capacity of moving and recovering the above crude oils consists in adding lighter hydrocarbon fractions to these crude oils. This addition reduces the viscosity of the system and therefore facilitates the moving and recovery of heavy crude oils, but has the disadvantage of requiring high investments which make the procedure rather onerous. In addition light hydrocarbon fractions or crude oils are not always available on site.

Another method for improving the fluidity in a pipeline of highly viscous hydrocarbon products consists in installing heating devices at frequent intervals along the pipeline; in this way the viscosity of the crude oil is reduced thus facilitating its movement. These heating devices can operate using part of the product to be moved as fuel. This technique has the serious disadvantage of resulting in a 15–20% loss of the transported product.

Another method for transporting heavy petroleum products via a pipeline consists in transporting them as oil emulsions in water, decisively less viscous than the corresponding crude oils.

The oil emulsions in water (O/W emulsions) are prepared by adding water and an emulsifying agent to the oil, and then moving the emulsion thus formed. The emulsifying agents should be capable of producing a fluid and stable O/W emulsion with a high oil content.

To ensure that this process is advantageous, it is therefore necessary for the emulsifying agent not to be costly and to give emulsions which are stable to pumping and transportation via pipeline.

The emulsifying agents described in the prior art do not always satisfy these requirements.

For example U.S. Pat No. 4,246,920, U.S. Pat. No. 4,285,356, U.S. Pat. No. 4,265,264 and U.S. Pat. No. 4,249,554 describe emulsions which contain only 50% of oil; this means that under these conditions about half of the volume of the pipeline is not available for the transporting oil.

On the other hand CA-A-1.108.205, CA-A-1.113.529, CA-A-1.117.568 and U.S. Pat. No. 4,246,919 indicate rather low reductions in viscosity and a rather low oil content.

U.S. Pat. No. 4,770,199 describes emulsifying agents consisting of complex mixtures of non-ionic alkoxylated surfactants with a ethoxylated-propoxylated carboxylated species. The non-ionic surfactant contained in the above surfactant, as well as being sensitive to shears, is also sensitive to temperature variations and consequently becomes insoluble in water under certain temperature conditions. In addition the above surfactants are very costly and cause an increase in the process costs.

Finally EP-A-237.724 desribes, as emulsifying agents, mixtures of ethoxylated carboxylates and ethoxylated sulfates, products which are not very accessible on the market and are rather expensive.

WO 93/01775 solves the above problem by not using emulsifying agents but sulfonated dispersants, substances which are widely used also in other industrial applications and therefore easily available on the market at low costs.

The problem still remains however of moving the heavy crude oils using an aqueous phase which is highly rich in salts. In fact, for the moving of heavy crude oils sometimes only water with a high content of salts, for example reservoir water and sea water, is available. This creates considerable problems in using sulfonated dispersants as it is well known that a high saline concentration considerably decreases, and sometimes cancels, the efficiency of sulfonated dispersants as it considerably reduces or nullifies the electrostatic charge of the above sulfonates.

In the moving of heavy crude oils with water to which emulsifying agents and/or dispersants have been added, it is also essential that this dispersion/emulsion, once formed, does not give rise (at least in short periods of time), under pumping or in the case of blockage of the pump, to separation of the hydrocarbon phase from the aqueous phase. It is in fact easy to understand that this separation would block the moving owing to the high viscosity of the hydrocarbon phase.

A process has now been found for moving and transporting heavy crude oils by means of aqueous solutions of particular sulfonated dispersants, even in the presence of high concentrations of salts. The above dispersants also allow a suspension whose hydrocarbon phase always contains, both during moving and the rest, at least 25% of water. This also allows there to be, even in the case of separation of the phases, always a sufficiently fluid dispersion to be easily pumped.

In accordance with this, the present invention relates to a process for recovering and moving highly viscous petroleum derivatives by the formation of aqueous dispersions in the presence of water with a salinity of more than 0.6%, particularly from 1 to 15% by weight, by means of the use of hydrosoluble sulfonated dispersants, said process being characterized in that the above sulfonated dispersants have a content of the high molecular weight fraction, determined by SEC analysis (Size Exclusion Chromatography), of more than 4%, preferably of more than 5.5%, even more preferably of between 7 and 25%.

The term sulfonated dispersants refers to those sulfonates which have the characteristics specified in Ulmann's Encyclopedia of Chemical Technology, 5th Edition, Vol.A8, pages 586–592, or high solubility in water and limited lowering of the surface tension of the water.

Typical examples of sulfonated dispersants are:

a) salts of alkaline or earth-alkaline metals or ammonium salts of condensates between naphthalenesulfonic acid and formaldehyde;

b) salts of alkaline or earth-alkaline metals or of ammonium, of sulfonated and oxidated fuel-oils from steam-cracking;

c) salts of alkaline or earth-alkaline metals or ammonium salts of the sulfonates obtained by oligomerization and subsequent sulfonation of fuel-oils from steam-cracking.

The salts of condensates between naphthalenesulfonic acid and formaldehyde are well-known commercial products, mainly used as superfluidifying agents of concrete.

The salts of sulfonated and oxidated fuel-oils from steam-cracking (FOKS) are described in EP-A-379.749. In these processes the sulfur trioxide acts not only as sulfonating agent but also as oxidant. Whereas with sulfonation sulfonic groups are introduced, the oxidation causes an increase in the molecular weights.

The salts of sulfonates obtained by the oligomerization and subsequent sulfonation of fuel-oils from steam-cracking are described in EP-A-658.616.

These sulfonates with dispersing properties, although belonging to various groups, generally have a molecular weight of more than 1000. Owing to their high solubility in water and to the presence of inorganic salts, an accurate determination of the relative molecular weights is usually difficult.

With respect to Fuel-oil from steam-cracking, this is a high-boiling liquid residue deriving from cracking from naphtha and/or gas oil to give light olefins, particularly ethylene: this fuel oil has no valid commercial use, and its price is therefore calculated per calorie. Most of the world production of ethylene derives from the cracking of gas oil and/or naphtha in the presence of steam (see Ulmann's Encyclopedia of Industrial Chemistry, Vol. A10, page 47). The by-products of this process partly consist of gases such as hydrogen, methane, acetylene, propane, etc., of liquid fractions having a boiling point of between 28 and 205° C., and finally of a high-boiling residue, the so-called fuel-oil from steam-cracking (hereafter indicated as FOK). This fuel-oil is formed in varying yields depending on the operating conditions of the cracker, but mainly in relation to the feeding. Yields of fuel-oil are typically 15–20% feeding gas oil and 2–5% feeding naphtha. Also the chemical composition varies slightly depending on the above parameters. In any case FOK has a minimum content of aromatics of 70%, normally between 80 and 90%, determined by chromatography on a column according to the method ASTM D2549, the complement to 100 consisting of saturated and polar products. The aromatic part of FOK consists, for at least 75%, of armomatics and alkyl aromatics having two or more condensed rings between each other. At least 50% of FOK boils at a temperature of less than 340° C., its carbon content is generally higher than 80% by weight, the density at 15° C. higher than 0.970 kg/dm$^3$.

The sulfonates described above are useful for moving highly viscous petroleum products in the form of aqueous dispersions.

The term "dispersion" is applied to a multiphase system, in which one phase is continuous and at least another more or less finely dispersed.

In the process for moving petroleum products of the present invention, the continuous phase of the dispersion is water, whereas the dispersed phase consists of particles, probably both solid and liquid, of heavy petroleum product. The above aqueous dispersions are for the most part electrostatically stabilized by this dispersants.

In the above dispersions with which petroleum products are moved, the weight ratio between petroleum product to be moved and salt water can vary widely, for example from 90/10 to 10/90. It is preferable however, for obvious economic reasons, to use high contents of petroleum residues, even if these conditions could cause the disadvantage of excessive viscosity.

An ideal composition of the dispersion, depending on the type of product to be moved, comprises a content of salt water of between 15 and 60% by weight, preferably from 35 to 50% by weight, with respect to the total weight of the dispersion. The water content can depend on various factors, for example the type of crude oil to be moved and the salt content of the water.

Also the quantity of dispersant depends, mainly, on the type of products to be moved; in any case the quantity necessary for having a fluid and pumpable dispersion is between 0.05% and 2% by weight, preferably between 0.07% and 1.2%, referring to the total quantity of water and petroleum product.

The term heavy crude-oils refers to highly viscous crude-oils which cannot be extracted and moved with the usual techniques. More specifically, these crude-oils have an API density grade of less than 15 and a viscosity at 30° C. greater than 40,000 mPas.

The aqueous dispersion of the petroleum product can be conveniently carried out in the following way: an aqueous solution of the salt, preferably of sodium, of the sulfonated dispersant of the present invention is added to the heavy petroleum product to be moved and the dispersion is prepared by stirring the two phases, for example with a turbine, or with a blade stirrer or with centrifugal pumps.

When exploiting oil wells containing heavy crude-oils which cannot be moved with the usual techniques, the crude-oil can be recovered by the procedure described above. In particular it is possible to inject the aqueous solution of the dispersant into the well so that it enters into contact with the oil at a depth greater than or equal to that of the recovery pump. In this case the mechanical mixing action produced by the pump (of the jet pump or sucker-rod type, for example) will be sufficient to produce a fluid dispersion at the head of the well.

The above aqueous solution of the dispersant can be injected into the well at a temperature approximately equal to the external temperature, or, according to a less preferred embodiment, it can be preheated to a temperature almost equal to that of the well bottom, for example from 30 to 100° C. In any case the dispersants used in the process of the present invention, as generally all sulfonated dispersants, are not very sensitive to temperature and shear.

It should be pointed out that the good rheological properties, necessary for an efficient recovery of the oil as aqueous dispersion, are neither related to the homogeneity of the dispersion nor to the dimensions of the particles (solid or liquid) dispersed in the water. In other words the moving process of highly viscous petroleum products does not require particular mixing forms, and is not linked to particular particle dimensions. In fact the crude oil can be moved and recovered even when the dispersed heavy oil is in the form of particles with macroscopic dimensions.

The process of the present invention is particularly advantageous when reservoir water with a high salinity is used, or if the well is in the sea.

As mentioned above, it is extremely important not only for the dispersion to be fluid and pumpable (and therefore in the form of dispersion of oil in water, O/W) in the preparation and transporting phase (at least as far as the coasts, where refineries are normally situated) but also, if there are drawbacks such shut-in of the pumps, that the dispersion is not inverted from O/W to W/O (with obvious problems of pump start-up) or that it excessively separate into two layers of oil and water.

The dispersants which can be used in the process of the present invention also have this advantage.

The following examples provide a better illustration of the present invention.

EXAMPLES

The oil/water dispersions are prepared by adding the aqueous solution of the dispersant, diluted so as to have the desired oil/water ratio, to the oil to be moved.

The dispersion is stirred for a time normally of between 30 seconds and 5 minutes with a turbine at about 10000 rpm. During the above stirring phase, the temperature rises by a few degrees centrigrade, for example from 24 to 47° C.

At the end of the above preparation phase, the suspension is left to rest, at a temperature of from 17 to 23° C.

The table shows the type of dispersing additive, its concentration and the salinity of the water.

In the column "water separation", the weight % of the separated aqueous phase is given, after a certain period of rest, with respect to the water charged in the preparation of the dispersion.

The column "viscosity" indicates the viscosity, at 100 sec$^{-1}$ and at 25° C., of the surnatant phase (in which almost all the oil and water not previously separated are contained) after the above rest period at a temperature of from 17 to 23° C.

In all the tests (except for tests A25 to 28), a heavy crude oil called OG 93 was used as hydrocarbon phase, having the following characteristics: API Density=13.3, density (15° C.)=0.9845 kg/l, Pour point=+9° C., $C_7$ Asphaltenes=9.0%, $C_5$ Asphaltenes=7.3%, Water=0.58%.

Table 1 indicates, as a comparison, the characteristics of the dispersions prepared in the presence of the dispersant D45 (naphthalenesulfonic acid/formaldehyde condensate) which does not form part of the dispersants to be used in the process of the present invention.

TABLE 1

Oil/Water ratio = 50/50

| Example Nr. | Additive Type | Salinity % wt/wt | % wt/wt | Water separation hours | % wt/wt | Viscosity mPas |
|---|---|---|---|---|---|---|
| 1 comp. | D 45 | 0.2 | 0.21 | 70 | 6.9 | 80 |
| 2 comp. | D 45 | 0.6 | 0.24 | 70 | 8.6 | 79 |
| 3 comp. | D 45 | 0.2 | 0.39 | 118 | 7.2 | 148 |
| 4 comp. | D 45 | 0.6 | 0.39 | 118 | 12.4 | 183 |
| 5 comp. | D 45 | 0.2 | 0.57 | 118 | 25.9 | 248 |
| 6 comp. | D 45 | 0.6 | 0.57 | 118 | 14.7 | 159 |
| 7 comp. | D 45 | 0.2 | 0.75 | 165 | 38.7 | >10,000 |
| 8 comp. | D 45 | 0.6 | 0.75 | 165 | 46.2 | >10,000 |
| 9 comp. | D 45 | 0.2 | 4.25 | 18 | 82.9 | >10,000 |
| 10 comp. | D 45 | 0.6 | 4.25 |  | *** |  |
| 11 comp. | D 45 | 0.2 | 2.13 | 2 | 93.3 | >10,000 |
| 12 comp. | D 45 | 0.6 | 2.13 | 2 | 73.3 | >10,000 |

*** it was impossible to prepare a sufficiently fluid slurry.

From the data of table 1 it can be seen how the dispersant D45 does not provide fluid dispersions when the salinity is higher than about 0.6% in NaCl.

Table 2 shows the data of mixtures of oil/water fluidified with a sulfonated dispersing additive of the present invention. This additive (M 5000) forms part of the group of sulfonated dispersants of the compound D45 (condensates of formaldehyde with naphthalenesulfonic acid), but, as can be seen further on, with a different molecular weight distribution.

The preparation procedure is the same as that used for the dispersions of table 1, with the difference that the temperature is between 80 and 90° C. for a time of 5 minutes (tests A1–A8), about 60° C. for 30 seconds (tests A9–A16), about 60–70° C. for 2 minutes (tests A17–A28).

The % of water separated as the lower phase with respect to the total water charged initially is indicated under "water separation", as "% wt sep.".

The water content of the upper surnatant, in which the hydrocarbon phase is almost totally contained, is again indicated under "water separation" as "% wt surn.".

In tests A1–A24 an oil called OG93 was used as heavy crude-oil, whereas in tests A25–A28 a crude-oil called OG63 was used having a water cut of 13%.

The characteristics of the oil OG93 have been previously specified.

With respect to OG63, this has the following characteristics: API Density=10.2, density (15° C.)=1.0064 kg/l, Pour Point=+12° C., $C_7$ Asphaltenes=10.7%, $C_5$ Asphaltenes= 7.3%, Water=13%.

In Table 2 and subsequent tables, water having a salinity content of 8.5% (expressed as NaCl), is gun-barrel water having the following composition of cations: Na=26610 mg/l; K=1580 mg/l; Li=8.7 mg/l; Ca=5880 mg/l; Mg=825 mg/l; Ba=6.9 mg/l; Sr=220 mg/l; Fe=0.9 mg/l; Mn=1.0 mg/l; Al=0.1 mg/l; $NH_4$ =58 mg/l; $SiO_2$=74.9 mg/l.

In the case of tests with water at 4.25% of salinity, the above gun barrel water diluted with deionized water, was used.

In the case of water with salinity of 15.3%, gun barrel water with NaCl added, was used.

TABLE 2

Additive A = M5000

| Example Nr | O/W wt/wt | Additive wt % | Salinity wt % | Water separation hrs | wt % sep. | wt % surn. | Viscosity mPas |
|---|---|---|---|---|---|---|---|
| A1 | 50/50 | 0.1 | 8.5 | 24 | 44.6 | 34.1 | 742 |
| A2 | 50/50 | 0.2 | 8.5 | 24 | 39.4 | 35.6 | 564 |
| A3 | 50/50 | 0.6 | 8.5 | 24 | 30.5 | 38.7 | 504 |
| A4 | 50/50 | 1 | 8.5 | 24 | 26.7 | 40.1 | 381 |
| A5 | 65/35 | 0.07 | 8.5 | 24 | 18.7 | 29.1 | 348 |
| A6 | 65/35 | 0.14 | 8.5 | 24 | 21 | 28.8 | 526 |
| A7 | 65/35 | 0.42 | 8.5 | 24 | 11.1 | 31.2 | 688 |
| A8 | 65/35 | 0.7 | 8.5 | 24 | 11.6 | 30.8 | 797 |
| A9* | 50/50 | 0.1 | 4.25 | 24 | 45 | 34 | 587 |
| A10* | 50/50 | 0.2 | 4.25 | 24 | 43.1 | 35 | 471 |
| A11* | 50/50 | 0.6 | 4.25 | 24 | 50.9 | 32.4 | 495 |
| A12* | 50/50 | 1 | 4.25 | 24 | 53.4 | 31.4 | 599 |
| A13* | 50/50 | 0.1 | 8.5 | 24 | 58.5 | 27.9 | 290 |
| A14* | 50/50 | 0.2 | 8.5 | 24 | 60.3 | 26.5 | 294 |
| A15* | 50/50 | 0.6 | 8.5 | 24 | 63.4 | 24.7 | 209 |
| A16* | 50/50 | 1 | 8.5 | 24 | 63.9 | 25.1 | 307 |
| A17c | 50/50 | 0.6 | 0 | 24 | 20.7 | 43 | 122 |

TABLE 2-continued

Additive A = M5000

| Example Nr | O/W wt/wt | Additive wt % | Salinity wt % | Water separation hrs | wt % sep. | wt % surn. | Viscosity mPas |
|---|---|---|---|---|---|---|---|
| A18 | 50/50 | 0.6 | 4.25 | 24 | 28.2 | 39.6 | 193 |
| A19 | 50/50 | 0.6 | 8.5 | 24 | 59.5 | 27.3 | 665 |
| A20 | 50/50 | 0.6 | 15.3 | 24 | 50.1 | 30.5 | 524 |
| A21c | 50/50 | 1.2 | 0 | 24 | 27.9 | 42.3 | 220 |
| A22 | 50/50 | 1.2 | 4.25 | 24 | 33.9 | 38.7 | 310 |
| A23 | 50/50 | 1.2 | 8.5 | 24 | 49.8 | 32 | 531 |
| A24 | 50/50 | 1.2 | 15.3 | 24 | 47.9 | 31.2 | 508 |
| A25c | 50/50 | 0.6 | 0 | 24 | 6 | 54.7 | 270 |
| A26 | 50/50 | 0.6 | 4.25 | 24 | 16.5 | 50.1 | 295 |
| A27 | 50/50 | 0.6 | 8.5 | 24 | 39.5 | 42.2 | 370 |
| A28 | 50/50 | 0.6 | 15.3 | 24 | 45.1 | 38.7 | 420 |

Table 2A indicates other tests carried out with the same dispersant (M5000), but with a slightly different preparation procedure.

TABLE 2A

| Example Nr | O/W wt/wt | Additive wt % | Salinity wt % | Water separation hrs | wt % sep. | wt % surn. | Viscosity mPas |
|---|---|---|---|---|---|---|---|
| T1 | 50/50 | 0.1 | 8.5 | 24 | 76.1 | 19.9 | 796 |
| T2 | 50/50 | 0.2 | 8.5 | 24 | 66.3 | 22.1 | 895 |
| T3a | 50/50 | 0.6 | 8.5 | 24 | 62.2 | 24.6 | 923 |
| T3b | 65/35 | 0.14 | 8.5 | 24 | 28.7 | 29.7 | 619 |
| T4 | 50/50 | 4 | 8.5 | 24 | 59.6 | 26.2 | 636 |
| T5 | 50/50 | 0.2 | 8.5 | 24 | 66.4 | 25.5 | 872 |
| T6 | 50/50 | 0.6 | 8.5 | 24 | 53.9 | 29.7 | 707 |
| T7a | 50/50 | 1 | 8.5 | 24 | 54.6 | 30.1 | 804 |
| T7b | 65/35 | 0.42 | 8.5 | 24 | 40.2 | 23.4 | 1049 |

The first dispersions (T1–T4) were prepared at 20–32° C. with 2 minutes of stirring, whereas the other 3 (T5–T7) at 21–24° C. for 30 seconds.

It can be seen that, regardless of the preparation procedure, the properties of the dispersions are more or less equivalent to each other and also with respect to the other dispersions of table 2 prepared at about 60–90° C.

The data of table 2 and 2A show how the sulfonated dispersant M5000 is efficient in fluidifying heavy crude oils both with reservoir water (gun barrel) with a high salinity (8.5% and 15.3%) and with sea water with a salinity of about 4.25%.

Table 3 shows the properties of another dispersant (M1000) of the present invention belonging to the same group of sulfonated dispersants.

TABLE 3

(Additive B = M1000)

| Example Nr | O/W wt/wt | Additive wt % | Salinity wt % | Water separation hrs | wt % sep. | wt % surn. | Viscosity mPas |
|---|---|---|---|---|---|---|---|
| B1 | 50/50 | 0.1 | 8.5 | 24 | 44.7 | 33 | 349 |
| B2 | 50/50 | 0.2 | 8.5 | 24 | 41.2 | 35.2 | 862 |
| B3 | 50/50 | 0.6 | 8.5 | 24 | 34 | 37.6 | 1077 |
| B4 | 50/50 | 1 | 8.5 | 24 | 31.9 | 39.1 | 633 |
| B5 | 65/35 | 0.07 | 8.5 | 24 | 21.8 | 28.4 | 366 |
| B6 | 65/35 | 0.14 | 8.5 | 24 | 14.7 | 30.1 | 561 |
| B7 | 65/35 | 0.42 | 8.5 | 24 | 6.2 | 31.6 | 884 |
| B8 | 65/35 | 0.7 | 8.5 | 24 | 10.2 | 31.9 | 938 |
| B9* | 50/50 | 0.1 | 8.5 | 24 | 60.2 | 26 | 327 |
| B10* | 50/50 | 0.2 | 8.5 | 24 | 62.4 | 25.1 | — |
| B11* | 50/50 | 0.6 | 8.5 | 24 | 65.8 | 22.8 | — |
| B12* | 50/50 | 1 | 8.5 | 24 | 64.7 | 25.3 | 577 |
| B13* | 50/50 | 0.1 | 4.25 | 24 | 51.7 | 31.3 | 391 |

TABLE 3-continued (Additive B = M1000)

| Example | O/W | Additive | Salinity | Water separation | | Viscosity |
|---|---|---|---|---|---|---|
| Nr | wt/wt | wt % | wt % | hrs | wt % sep. wt % surn. | mPas |
| B14* | 50/50 | 0.2 | 4.25 | 24 | 53.5 30.7 | 546 |
| B15* | 50/50 | 0.6 | 4.25 | 24 | 52.1 32.4 | 559 |
| B16* | 50/50 | 1 | 4.25 | 24 | 50.3 33.1 | 709 |
| B17** | 50/50 | 0.6 | 8.5 | 24 | 60.5 26.2 | 918 |

The tests marked with * were carried out by mixing at 60° C. with a turbine stirrer at 10000 rpm for 30 seconds.

All the other tests, except for B17, were carried out at 80–90° C. with a turbine stirrer at 10000 rpm for 5 minutes.

The test B17 was prepared at 22–24° C. with 30 seconds of stirring (at 10000 rpm).

The data of table 3 show how another dispersant having appropriate analytical characteristics is also efficient in moving oil/water mixtures with a high degree of salinity and also in a ratio oil/water of 65/35.

Finally table 4 indicates the data of dispersions prepared using dispersants belonging to the group sulfonated and oxidated fuel-oils from steam-cracking.

The dispersions of table 4 were prepared at a temperature of from 24 to 45° C. for a time of five minutes at 10000 rpm.

TABLE 4

Additive: FOKS; salinity 8.5%

| Example | O/W | Additive | | Water separation | | Viscosity |
|---|---|---|---|---|---|---|
| Nr | wt/wt | type | wt % | hrs | wt % sep. wt % surn. | mPas |
| C1 c | 50/50 | 1/95 | 0.2 | 42 | 64.2 26.4 | 1030 |
| C2 c | 50/50 | 1/95 | 0.6 | 42 | 65.7 25.6 | 1300 |
| C3 c | 50/50 | 2/95 | 0.2 | 42 | 62.7 27.2 | 850 |
| C4 | 50/50 | 3/95 | 0.6 | 42 | 29.9 40.2 | 175 |
| C5 c | 65/35 | 4/95 | 0.2 | 42 | 71.6 22.1 | — |
| C6 c | 65/35 | 4/95 | 0.6 | 42 | 74.6 20.2 | — |
| C7 c | 65/35 | 5/95 | 0.2 | 42 | 62.7 27.2 | 960 |
| C8 c | 65/35 | 5/95 | 0.6 | 42 | 73.1 21.2 | — |
| C9 | 50/50 | 7/95 | 0.6 | 42 | 46.3 35 | 260 |
| C10 | 50/50 | 7/95 | 0.2 | 42 | 55.2 30.9 | 400 |
| C11 | 50/50 | 8/95 | 0.6 | 42 | 59.7 28.7 | 800 |
| C12 | 50/50 | 3/95 | 0.6 | 240 | 39.6 37.6 | 208 |
| C13 | 50/50 | 7/95 | 0.6 | 240 | 65.4 27.5 | 1031 |
| C14 | 50/50 | 8/95 | 0.6 | 240 | 67.1 27.3 | 835 |

The data of table 4 clearly show how the additives of the present invention in particular those indicated as 3/95, 7/95 and 8/95) are particularly efficient in moving heavy crude-oils and transporting them via pipeline without any problems. The fact that the water content of the surnatant phase is higher than 25% even after 240 hours of rest, means that the dispersion can be pumped without problems for at least several hundred kilometers.

DESCRIPTION OF THE SEC METHOD

1) Preparation of the sample: 200–300 mg of dispersant to be examined are dissolved in 15–20 ml of water and are percolated on resin (amberlite IR-120) washing with portions of water. The eluate is dried in an oven at 60° C. For each sample, 25 mg are dissolved in 2 ml of mobile phase.

2) Mobile phase: LiBr 0.1 M in N,N-dimethylformamide.
3) Chromatographic columns: Chrompack Microgel 3 $\mu$m mixed (3 columns of 250 mm×7.7 mm I.D.).
4) Flow in column: 0.4 ml/min., counterpressure 1000–1200 p.s.i.
5) Temperature of columns: 20° C.
6) Duration of chromatographic run: 70 minutes.
7) Quantity of sample injected: 200 $\mu$l with autosampling device.
8) Chromatogram processing: Program SEC Waters Maxima 820.
9) Detectors: Waters RI 410 (refraction index) and Waters UV 484 (wave length used 293 nm).
10) Pump: Waters 600 MS.
11) Autosampling device: Water 717.

Table A shows the molecular weight distributions, determined according to the method described above, of the samples belonging to the group of salts of naphthalene-sulfonic acid condensed with formaldehyde.

Peak 1 (low molecular weights) has an elution time of between 55 and 47.5 minutes, peak 2 (medium molecular weights) from 47 to 33.9 minutes, peak 3 (high molecular weights) from 33.9 to 30.5 minutes.

Table A also shows the molecular weights, calculated on the basis of internal standards with controlled molecular weight and structure, synthesized in our laboratories.

TABLE A

| Sample | % Peak 1 | % Peak 2 | % Peak 3 | Mw | Mn |
| --- | --- | --- | --- | --- | --- |
| D45 | 16.17 | 82.83 | 1 | 1997 | 1111 |
| M-1000 | 11.74 | 80.48 | 7.78 | 3990 | 1806 |
| M-5000 | 9.81 | 80.84 | 9.35 | 4304 | 1937 |

Finally Table B shows the % of the four zones into which the chromatogram of the FOKS is divided. Areas 1 and 2 refer to products with a low molecular weight, area 3 to products with a medium molecular weight and area 4 to products with a high molecular weight.

Some of these (those having a final "c") are shown as a comparison as they do not form part of the present invention. Table B also indicates the molecular weights, calculated (having no adequate standards owing to the chemical complexity of the substrates which form the sulfonated and oxidated fuel-oils from steam-cracking) using the same standards used for the naphthalenesulfonic acid/formaldehyde condensates.

TABLE B

| Sample | % Peak 1(low mw) | % Peak 2(low mw) | % Peak 3(medium mw) | % Peak 4(high mw) | Mw | Mn |
| --- | --- | --- | --- | --- | --- | --- |
| 1/95c | 17.52 | 20.48 | 61 | 1 | 2285 | 974 |
| 2/95c | 20 | 15.06 | 63.34 | 1.6 | 2479 | 1037 |
| 3/95 | 24.66 | 5.86 | 46.23 | 23.25 | 4784 | 1159 |
| 4/95c | 22.73 | 8.83 | 64.74 | 3.7 | 2974 | 1075 |
| 5/95c | 18.22 | 8.21 | 70.46 | 3.21 | 2974 | 1151 |
| 7/95 | 20.65 | 8 | 65.77 | 5.58 | 3246 | 1130 |
| 8/95 | 18.22 | 9.76 | 52.28 | 19.74 | 4314 | 1258 |

From the data of tables 1–4 and A–B, it can be seen that, regardless of their structure (naphthalenesulfonic acid condensates or sulfonated and oxidated fuel-oils from steam-cracking), only the sulfonated products are effective in a very saline environment, which have a content of the high molecular weight fraction of more than 4%, preferably higher than 5.5%, even more preferably from 7 to 25%.

Typical examples of particularly efficient sulfonated dispersants are the additives M1000, M5000 and, with respect to the sulfonated and oxidated fuel-oils from steam-cracking, the additives indicated as 3/95 and 7–8/95, which have a high molecular weight content of from 5.5 to 23.2%.

What is claimed is:

1. A process for recovering and moving highly viscous petroleum products by forming aqueous dispersions in the presence of salt water having salinity of more than 0.6%, which comprises forming an aqueous dispersion of said highly viscous petroleum compounds with one or more hydrosoluble sulfonated dispersants or salts thereof, wherein said one or more hydrosoluble sulfonated dispersants or salts thereof have a content of high molecular weight fraction, determined by size exclusion chromatography, of more than 4%.

2. The process according to claim 1, wherein the content of the high molecular weight fraction is higher than 5.5%.

3. The process of claim 2, wherein the content of the high molecular weight fraction is from 7 to 25%.

4. The process of claim 1, wherein the sulfonated dispersants are selected from the group consisting of alkali metal salts, alkaline earth metal salts, ammonium salts, and condensates of naphthalenesulfonic acid formaldehyde.

5. The process of claim 1, wherein the sulfonated dispersants are selected from the group consisting of alkali metal salts, alkaline earth metal salts, ammonium salts, and products obtained by oxidative sulfonation of fuel oils from steam cracking.

6. The process of claim 1, wherein the sulfonated dispersant is contained in a quantity of from 0.05% to 2% by weight with respect to the total weight of the water and petroleum products.

7. The process of claim 6, wherein the sulfonated dispersant is contained in a quantity of from 0.07% to 1.2% by weight.

8. The process of claim 1, wherein the salt water is present in a quantity of from 15 to 60% by weight with respect to the total weight of the dispersion.

9. The process of claim 8, wherein the salt water is present in a quantity of from 35 to 50% by weight.

10. The process of claim 1, wherein said highly viscous petroleum compounds have an API density grade of less than 15 and a viscosity of 30° C. of greater than 40,000 mPas.

11. The process of claim 1, which comprises adding an aqueous solution of one or more salts of the hydrosoluble sulfonated dispersants to the highly viscous petroleum products and to form a two phase mixture, and mixing the two phases.

12. The process of claim 11, wherein said salt is the sodium salt.

13. The process of claim 11, wherein said two phases are mixed with a turbine, blade stirrer or pump.

14. The process of claim 13, wherein said pump is a centrifugal pump, jet pump or sucker-rod pump.

15. The process of claim 11, wherein said highly viscous petroleum products are in a well.

16. The process of claim 15, wherein said well is in the sea.

* * * * *